US007117758B2

(12) United States Patent
Riedl

(10) Patent No.: US 7,117,758 B2
(45) Date of Patent: Oct. 10, 2006

(54) VIBRATION GENERATOR FOR A SOIL COMPACTING DEVICE

(75) Inventor: Franz Riedl, München (DE)

(73) Assignee: Wacker Construction Equipment A.G.., Munich (DE)

( * ) Notice: Subject to any disclaimer, the term of this patent is extended or adjusted under 35 U.S.C. 154(b) by 291 days.

(21) Appl. No.: 10/473,473

(22) PCT Filed: Sep. 27, 2002

(86) PCT No.: PCT/EP02/10894

§ 371 (c)(1),
(2), (4) Date: Sep. 26, 2003

(87) PCT Pub. No.: WO03/028905

PCT Pub. Date: Apr. 10, 2003

(65) Prior Publication Data

US 2004/0103730 A1 Jun. 3, 2004

(30) Foreign Application Priority Data

Sep. 28, 2001 (DE) ................................ 101 47 957

(51) Int. Cl.

| | |
|---|---|
| ***F16C 33/10*** | (2006.01) |
| ***F16C 33/00*** | (2006.01) |
| ***G05G 1/00*** | (2006.01) |
| ***E02D 7/18*** | (2006.01) |
| ***E01C 19/30*** | (2006.01) |

(52) U.S. Cl. .............................. 74/87; 74/22 R; 74/61; 74/591; 173/49; 404/133.05

(58) Field of Classification Search ................ 74/22 R, 74/61, 591, 87; 404/133.05, 133.1, 113; 173/49
See application file for complete search history.

(56) References Cited

U.S. PATENT DOCUMENTS

| | | | | |
|---|---|---|---|---|
| 2,248,182 | A * | 7/1941 | Mateer | 74/61 |
| 3,192,839 | A * | 7/1965 | Vivier | 404/117 |
| 3,625,074 | A * | 12/1971 | Waschulewskit et al. | 74/61 |
| 3,814,533 | A * | 6/1974 | Buck | 404/133.1 |
| 3,875,811 | A | 4/1975 | Fuller | |

(Continued)

FOREIGN PATENT DOCUMENTS

DE 1 634 474 2/1966

(Continued)

*Primary Examiner*—Richard Ridley
*Assistant Examiner*—Colby Hansen
(74) *Attorney, Agent, or Firm*—Boyle Fredrickson Newholm Stein & Gratz S.C.

(57) ABSTRACT

The invention relates to vibration generator for a soil compacting device referred to as a towed vibrating device. The vibration generator has two parallels arranged unbalanced shafts that each support a fixed and a freely rotating unbalanced mass. An unbalance adjusting device enables the position of both freely rotating unbalanced masses to be adjusted in such a manner that, during a maximum unbalance action of one of the unbalanced shafts, the unbalance action on the other unbalanced shaft is minimized. The unbalance adjusting device can alter the position of the unbalanced masses whereby rendering possible a to-and-fro movement of the soil compacting device or a compaction when stationary.

6 Claims, 4 Drawing Sheets

U.S. PATENT DOCUMENTS

| | | | | | |
|---|---|---|---|---|---|
| 4,211,121 | A | * | 7/1980 | Brown | 74/87 |
| 4,356,736 | A | * | 11/1982 | Riedl | 74/61 |
| 4,389,137 | A | * | 6/1983 | Riedl | 404/113 |
| 4,481,835 | A | * | 11/1984 | Storm | 74/61 |
| 4,561,319 | A | * | 12/1985 | Lilja | 74/61 |
| 4,771,645 | A | * | 9/1988 | Persson | 74/61 |
| 5,818,135 | A | * | 10/1998 | Riedl et al. | 310/81 |
| 6,227,760 | B1 | * | 5/2001 | Togami et al. | 404/84.1 |

FOREIGN PATENT DOCUMENTS

| | | | |
|---|---|---|---|
| DE | 37 08 922 | A1 | 3/1987 |
| DE | 41 30 231 | A1 | 9/1991 |
| DE | 100 38 206 | A1 | 8/2000 |
| DE | 100 57 807 | A1 | 11/2000 |
| EP | 0 092 014 | A1 | 4/1982 |

* cited by examiner

VIBRATION GENERATOR FOR A SOIL COMPACTING DEVICE

BACKGROUND OF THE INVENTION

1. Field of the Invention

The present invention relates to a vibration generator for a soil compacting device.

2. Description of the Related Art

For compacting soil, among others vibration plates known as "plate compactors" are known. In plate compactors, a vibration generator is seated in off-center fashion on a soil contact plate. The vibration generator is standardly a rotating imbalance shaft. The imbalance force, or centrifugal force, produced by the imbalance shaft pulls the soil contact plate (because of the off-center placement) upwards on one side and towards the front before the contact plate is pressed downward again, communicating the compacting energy to the soil. The vibration generator, which has a very simple construction, is thus able not only to produce the vibration required for the soil compacting, but also to move the soil contact plate forward.

Plate compactor plates of this type have outstanding movement behavior, in particular on difficult soil surfaces containing a high proportion of clay and high water content. Precisely on such cohesive soils, vibration plates having other designs can experience difficulty in moving forward. The advantageous characteristic of plate compactor plates is due to a comparatively large amplitude of the vibration generator, and to the presence of a constant reaction moment that, given a suitable direction of rotation of the imbalance shaft, permanently effects a determinate friction on the end of the soil contact plate situated opposite the vibration generator.

However, this design has turned out to have the disadvantage that it is not possible, using reasonably economical means, to execute a continuous reversing, i.e. a traveling back and forth, of the vibration plate, with the possibility of compacting at a point, i.e., purposive compacting at one location without forward movement of the vibration plate.

It is true that it is possible to situate imbalance shafts at the two opposite ends of the soil contact plate, and to drive only one of the two for forward or backward movement. However, in this case the imbalance shafts must be operated synchronously at double power consumption and with precise rotational speed, both for the stationary point compacting and for the transition from forward travel to backward travel, so that a considerable energy and control expense is required.

OBJECTS AND SUMMARY OF THE INVENTION

The underlying object of the present invention is to indicate a vibration generator for soil compacting which retains on the one hand the advantageous design of what is known as the plate compactor, while on the other hand enabling forward and backward movement of the soil compacting device, as well as stationary compacting.

According to the present invention, this object is achieved by a vibration generator having the features of patent claim 1. Advantageous developments of the present invention can be found in the dependent claims.

A vibration generator according to the present invention for a soil compacting device has two imbalance shafts that are coupled with one another in positively locking fashion so as to be capable of rotation, each bearing a fixedly attached first imbalance mass and a second imbalance mass that can be rotated on the imbalance shaft between at least two extreme positions. Thus, for each imbalance shaft it is possible to adjust the second imbalance mass carried thereon in such a way that its imbalance action either coincides with the action of the fixedly attached first imbalance mass, thus reinforcing this action, or counteracts the action of the first imbalance mass, thus compensating it largely or entirely.

According to the present invention, an imbalance adjustment device is provided that couples the second imbalance masses on the first and second imbalance shaft in positively locking fashion, and so as to be capable of rotation in opposite directions. Using the imbalance adjustment device, it is possible to set the imbalance effects of the first and second imbalance shafts in such a way that, in the extreme case, only one of the imbalance shafts produces, with the imbalance masses carried thereon, an imbalance effect, while the imbalance effects of the imbalance masses on the other imbalance shaft compensate one another, so that no imbalance arises there. Thus, it is possible to modify what is known as the "MR value"—the product of the imbalance mass and the imbalance radius—of the imbalance masses installed on the two imbalance shafts situated parallel to one another, in such a way that at the respective maximum of the one imbalance shaft, the other imbalance shaft has a minimum MR value, which can even be zero in the ideal case.

In these respective extreme positions, the pure plate compacting effect is achieved, as occurs also in known plate compactor plates having only one vibration generator having a single imbalance shaft. This effect can be achieved even though both imbalance shafts are in rotation, which is very significant for the life of the bearing, because the bearing is not statically loaded on one side by impacts.

Between the two extreme positions, it is also possible to set arbitrary additional intermediate positions for the two second imbalance masses. In this way, the soil compacting device that carries the vibration generator according to the present invention can move back and forth comfortably.

If the imbalance action of the two imbalance shafts is equal, stationary operation, at one location, of the soil compacting device is possible, and here a tilting vibration effect that is especially advantageous for the compacting occurs to its maximum extent. In this situation, the soil contact plate alternates between striking at the front and at the rear, enabling a particularly effective soil compacting.

In an advantageous further development of the present invention, the above-described vibration generator system is provided twice, the two systems being axially adjacent to one another. For this purpose, each imbalance shaft has two axially displaced first imbalance masses and two associated second imbalance masses that can be rotated. The two additional second imbalance masses on the first and second imbalance shaft are coupled with one another in positively locking fashion by a second imbalance adjustment device, in the same way as the two original second imbalance masses.

If the two imbalance adjustment devices can be controlled separately from one another, it is possible to produce a yawing moment about the vertical axis of the vibration generator, and thus the vertical axle of the soil compacting device, thus enabling steerability of the soil compacting device.

Advantageously, a steering device is provided with which the two imbalance adjustment devices can be controlled.

In another particularly advantageous further development of the present invention, it is attempted to keep the axial distance between the two imbalance shafts as large as possible.

For this purpose, two intermediate shafts that can be coupled in positively locking fashion so as to be capable of rotation are situated between the two imbalance shafts; these intermediate shafts transmit the rotational movement of the driven first imbalance shaft to the second imbalance shaft. Through the large distance between the two imbalance shafts, the drag action and the compacting action can be amplified.

Of course, the axial distance between the two imbalance shafts can be further increased through the placement of additional pairs of intermediate shafts.

BRIEF DESCRIPTION OF THE DRAWINGS

These and further advantages and features of the present invention are explained in more detail below on the basis of a plurality of examples, with the aid of the accompanying figures.

DETAILED DESCRIPTION OF THE PREFERRED EMBODIMENTS

Figure 1:
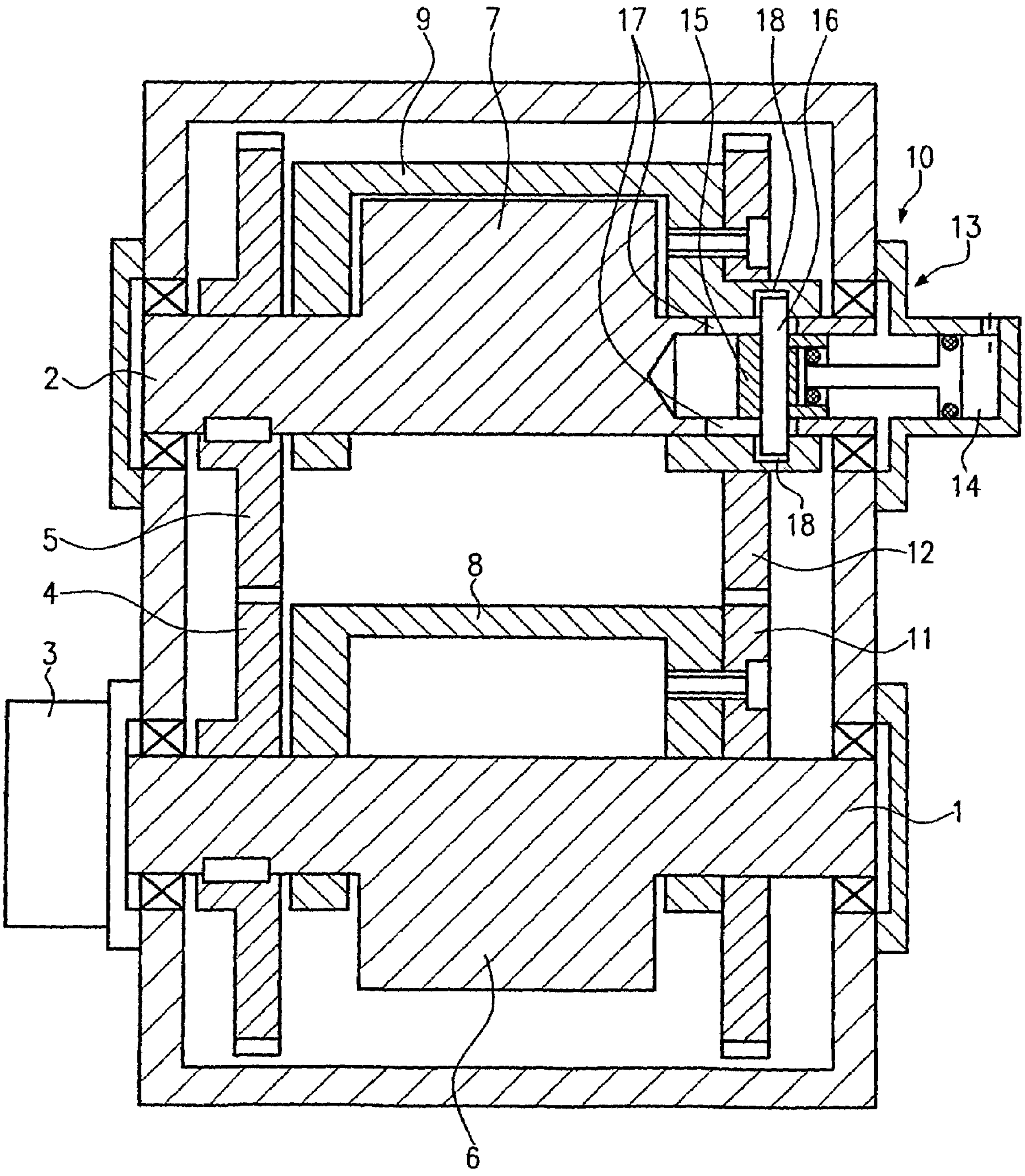
FIG. 1 shows a schematic sectional top view of a vibration generator according to the present invention.

FIG. 1 shows a first specific embodiment of a vibration generator according to the present invention, having a first imbalance shaft 1 and a second imbalance shaft 2.

First imbalance shaft 1 is driven rotationally in a known manner by a drive 3 (not shown in more detail), for example a hydraulic motor or a coupling with an internal-combustion engine (not shown).

Via two toothed wheels 4 and 5, first imbalance shaft 1 is coupled with second imbalance shaft 2 in positively locking fashion, so as to be capable of rotation in the opposite direction. That is, first and second imbalance shafts 1, 2 rotate in a manner counter to one another.

A first imbalance mass 6 is situated on first imbalance shaft 1, and second imbalance shaft 2 bears a first imbalance mass 7. First imbalance masses 6, 7 can be connected in one piece with imbalance shafts 1, 2 bearing them. It is also possible to fasten first imbalance masses 6, 7 to imbalance shafts 1, 2, for example using screws.

In addition, first and second imbalance shafts 1, 2 each bear a second imbalance mass 8, 9, which however is not connected fixedly with the imbalance shaft that bears it but rather is held by this shaft so as to be capable of being rotated. Second imbalance masses 8, 9 can each be rotated freely on first or second imbalance shaft 1, 2. It is also possible to realize only a limited capacity for rotation, which however should extend over a range of at least 180°.

The two second imbalance masses 8, 9 are coupled with one another by an imbalance adjustment device 10 in positively locking fashion, so as to be capable of rotation in opposite directions.

Imbalance adjustment device 10 has two toothed wheels 11 and 12, toothed wheel 11 being connected fixedly with second imbalance mass 8 of first imbalance shaft 1, while toothed wheel 12, which meshes with toothed wheel 11, is fixedly connected with second imbalance mass 9 on second imbalance shaft 2.

Toothed wheel 11 can be rotated freely, together with second imbalance mass 8, on first imbalance shaft 1. In contrast, as a component of imbalance adjustment device 10 a rotation device 13 is provided on second imbalance shaft 2, with which the relative position between second imbalance mass 9, or toothed wheel 12, on the one hand and second imbalance shaft 2 on the other hand can be adjusted precisely.

Rotation device 13 is known in its design and its manner of operation. It has a piston-cylinder unit 14 that can be actuated hydraulically or pneumatically, with which a positioning element 15, situated inside second imbalance shaft 2, can be moved back and forth axially.

Control element 15 has a pin 16 that extends through grooves 17 in second imbalance shaft 2 and engages in spiral grooves 18 that are formed on the inside of a hub that bears second imbalance mass 9.

As a result of this design, given an axial displacement of control element 15 by piston-cylinder unit 14, a rotation of second imbalance mass 9 relative to second imbalance shaft 2 is effected by means of pin 16.

This rotation is transmitted by toothed wheels 12 and 11, in the opposite direction, to second imbalance mass 8 on first imbalance shaft 1.

In this way, with the aid of imbalance adjustment device 10 it is possible to adjust the two second imbalance masses 8, 9 in such a way that they either counteract first imbalance masses 6, 7 (shown in FIG. 1 in the lower half of the picture by the position of imbalance masses 6, 8) or reinforce the action of the first imbalance mass (shown in FIG. 1 in the upper half of the picture by imbalance masses 7, 9).

However, as is also shown in FIG. 1, the adjustment takes place in such a way that it is always the case that only one imbalance mass pair on an imbalance shaft reaches a maximum imbalance action, while at the same time the imbalance masses on the other imbalance shaft compensate their action. In this way, the plate compactor principle is maintained. The imbalance shaft that does not achieve an imbalance effect is simply carried along without adversely affecting the action of the imbalance shaft that is producing the actual vibration. Due to the fact that the "deactivated" (so to speak) imbalance shaft also rotates, a one-sided loading of the shaft bearing is avoided.

A modification of the state by imbalance adjustment device 10 has the effect that the imbalance shaft, which still has no effect at the beginning, produces an imbalance, while the imbalance of the other imbalance shaft is reduced, and finally goes to zero. In this way, a change of direction of the plate compactor can be achieved.

FIG. 2 shows different positions for imbalance shafts 1, 2, or imbalance masses 6 to 9.

Figure 2A:
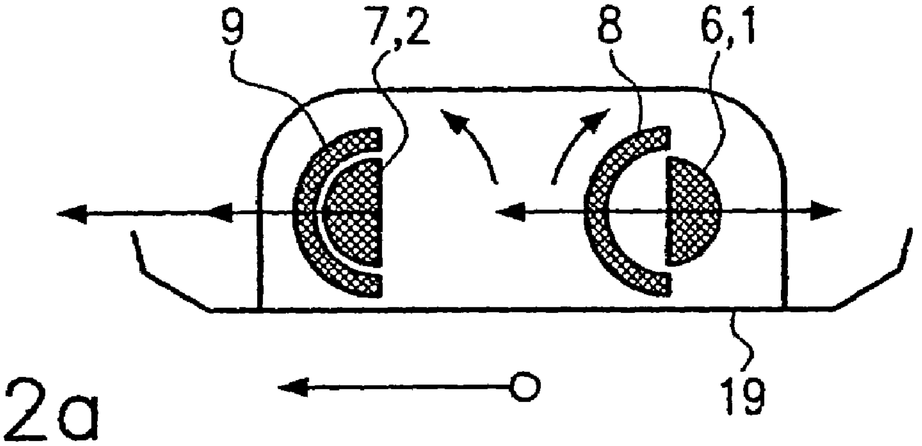
FIG. 2 shows, in a schematic side view, the force vectors produced by the individual imbalance masses, and the directions of motion resulting therefrom.

In part a) of FIG. 2, the state is shown that was already illustrated in the top view of FIG. 1. While imbalance masses 7, 9 in on second imbalance shaft 2 supplement one another in their action, the actions of imbalance masses 6, 8 on first imbalance shaft 1 compensate one another. This results in forward motion, to the left, of a soil contact plate 19 bearing the vibration generator. Due to their off-center situation, imbalance masses 7, 9 effect a one-sided lifting of soil contact plate 19, so that the soil compacting device shown in FIG. 2*a* moves to the left.

Figure 2B:
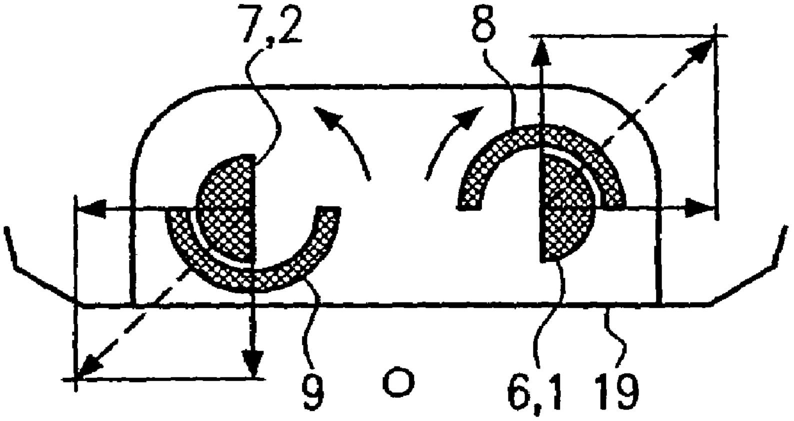

FIG. 2*b* shows an intermediate position. While imbalance shafts 1, 2, and first imbalance masses 6, 7 held fixedly thereby, remain unmodified in comparison with FIG. 2*a*), second imbalance masses 8, 9 are rotated relative to imbalance shafts 1, 2, with the aid of imbalance adjustment device 10. Both imbalance shafts 1, 2 now achieve an approximately equally large imbalance action, which is however directed upward and downward in alternating fashion. In this way, there results the tilting vibration effect, which is very effective for stationary compacting. No forward travel of soil contact plate 19 or of the overall soil compacting device takes place.

Figure 2C:
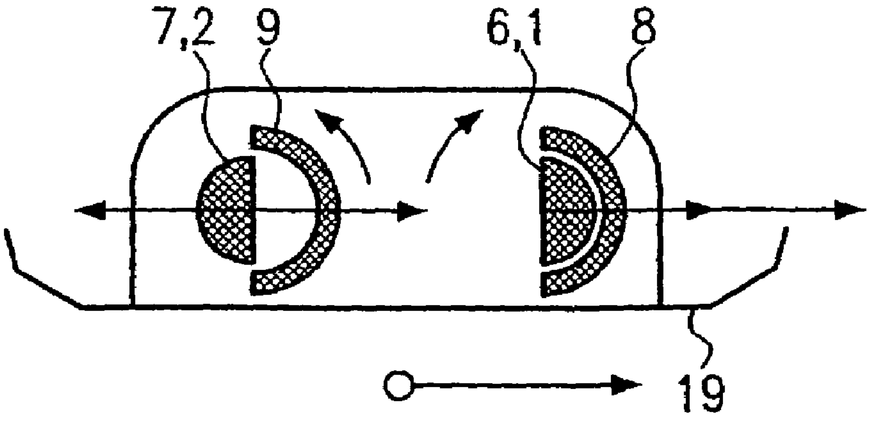

FIG. 2*c* corresponds to a reversal of the state shown in FIG. 2*a*. Here, imbalance masses 6 and 8 of first imbalance shaft 1 are adjusted in such a way that their action is superposed, while the effects of imbalance masses 7, 9 on second imbalance shaft 2 compensate one another. This results in travel in the opposite direction (to the right in FIG. 2*c*).

Figure 3:
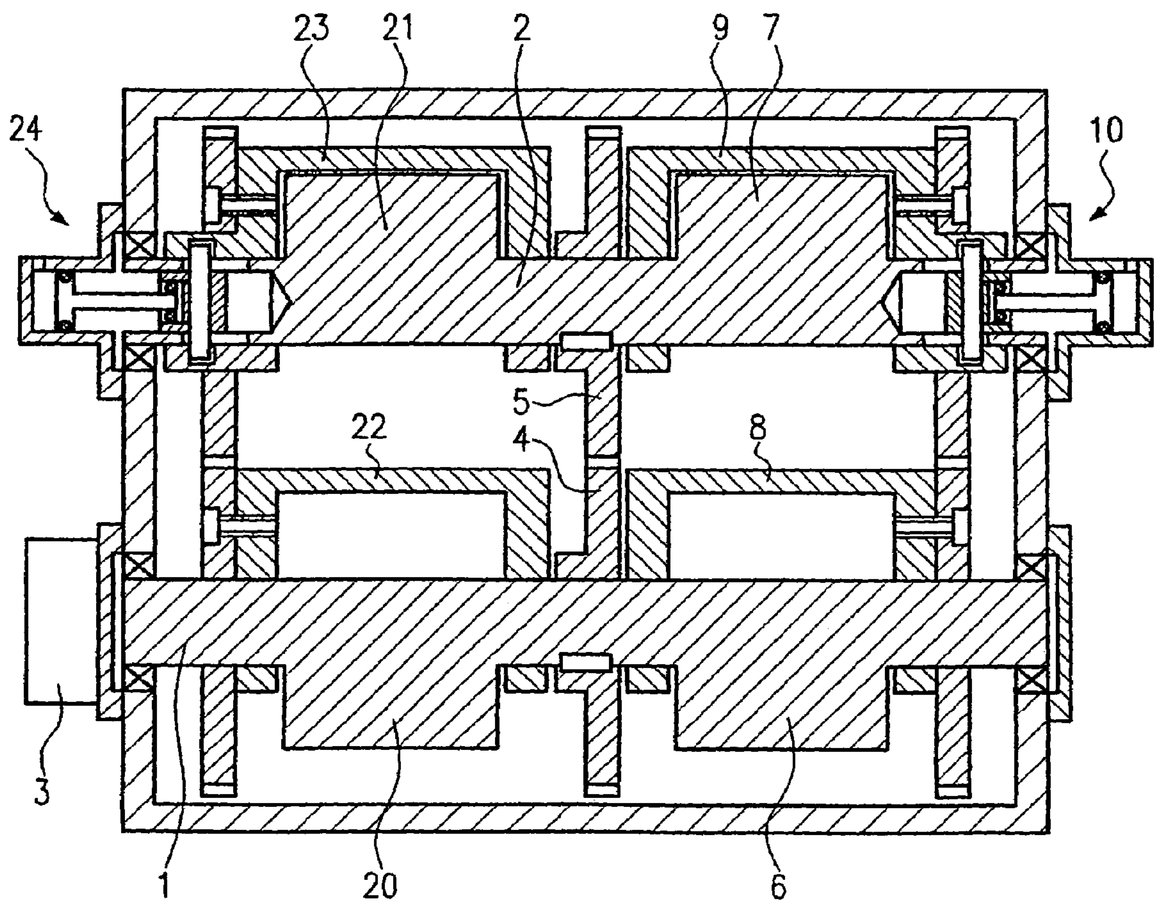
FIG. 3 shows a second specific embodiment of the present invention, having a vibration generator, for the steerability of a soil compacting device.

FIG. 3 shows a top view of a second specific embodiment of the present invention, in a schematic sectional representation.

In principle, the second specific embodiment corresponds to a doubling, i.e., a situation alongside one another of the first specific embodiment according to FIG. 1. Therefore, for simplification identical reference characters are used for the components already known from FIG. 1.

First imbalance shaft 1 now carries, besides first imbalance mass 6, an additional first imbalance mass 20, while second imbalance shaft 2 carries, alongside first imbalance mass 7, an additional first imbalance mass 21. Likewise, first imbalance shaft 1 carries, besides second imbalance mass 8, an additional second imbalance mass 22, and second imbalance shaft 2 carries, besides second imbalance mass 9, an additional second imbalance mass 23.

As second imbalance masses 8, 9 are coupled with one another in positively locking fashion so as to be capable of rotation in opposite directions by imbalance adjustment device 10, additional second imbalance masses 22 and 23 are also coupled with one another in positively locking fashion so as to be capable of rotation by a second imbalance adjustment device 24. The manner of functioning of second imbalance adjustment device 24 corresponds to that of first imbalance adjustment device 10, so that a detailed specification is not required here.

The rotational coupling of the two imbalance shafts 1 and 2 takes place, as in FIG. 1, by means of toothed wheels 4, 5.

Through a separate controllability of the two imbalance adjustment devices 10 and 24, it is possible to produce different resulting forces for the respective interacting imbalances. In this way, it is possible to produce a yawing moment about the vertical axle of the vibration generator (which stands perpendicular to the drawing plane of FIG. 3), and thus also about the vertical axle of the soil compacting device; with the aid of this yawing moment, it is possible to steer the soil compacting device.

Advantageously, the interaction of the two imbalance adjustment devices 10 and 24 is coordinated using a steering device (not shown) that can easily be handled by the operator.

Figure 4:
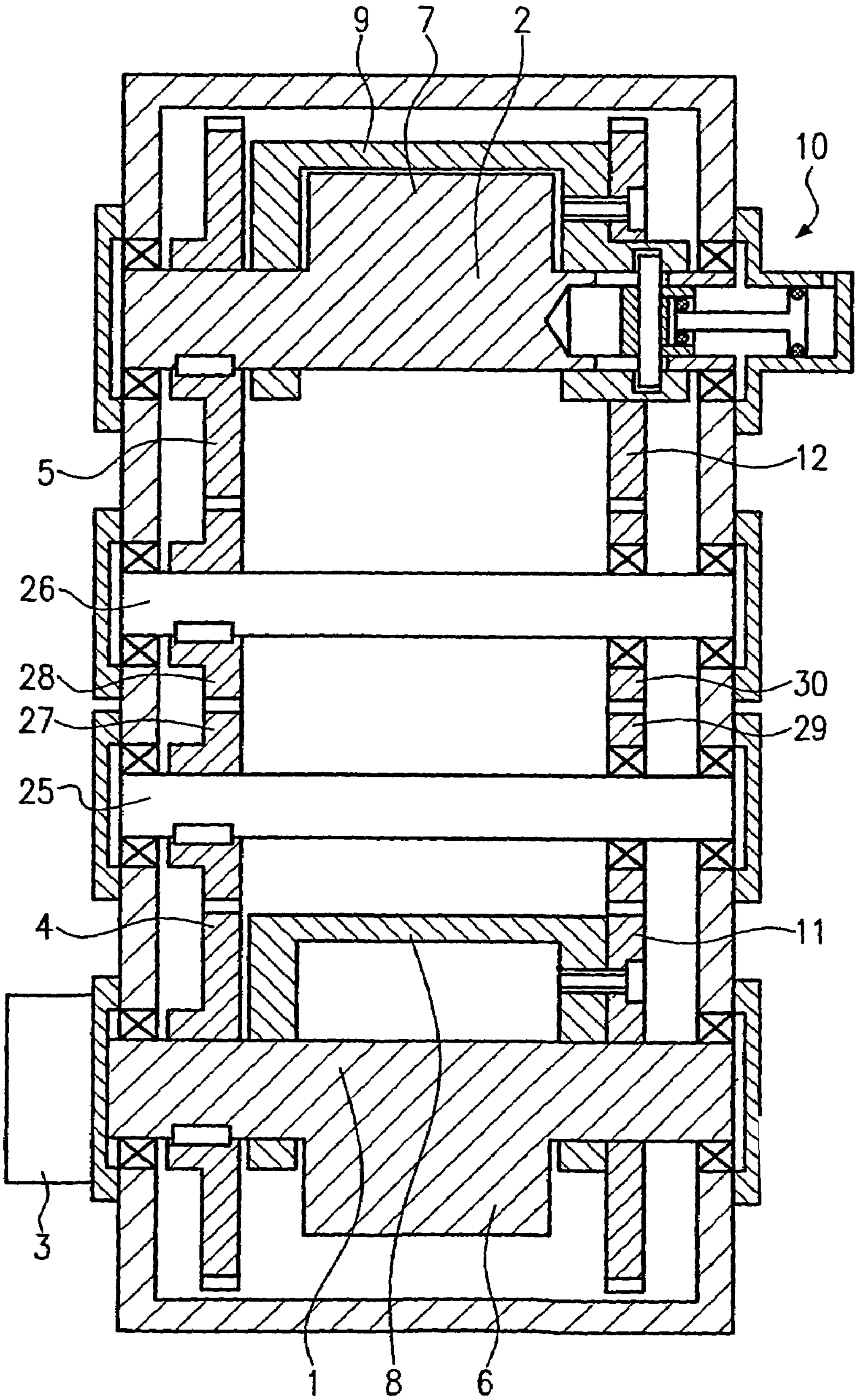
FIG. 4 shows a third specific embodiment of the present invention having a vibration generator, having an enlarged axial distance between the two imbalance shafts.

FIG. 4 shows a third specific embodiment of the present invention, in which the axial distance of the two imbalance shafts 1 and 2 has been enlarged. Because the two imbalance shafts 1 and 2, as well as the imbalance masses 6 to 9 carried thereby, correspond in their design to the first embodiment according to FIG. 1, a repetition of the description is omitted.

Between toothed wheels 4 and 5 of imbalance shafts 1 and 2, two intermediate shafts 25 and 26 are placed, which have toothed wheels 27, 28 and thus transmit the rotational movement of first imbalance shaft 1 to second imbalance shaft 2. In the same way, toothed wheels 29 and 30 are placed between toothed wheels 11 and 12 of imbalance adjustment device 10, and are carried by intermediate shafts 25, 26, but can be rotated freely on these shafts.

Through this arrangement, it is possible to significantly increase the axial distance between the two imbalance shafts 1 and 2, making it possible likewise to increase the spacing of imbalance shafts 1, 2 from the center. In this way, the drag effect can be improved.

Of course, for a large plate compactor, the second and third specific embodiments of the present invention, according to FIGS. 3 and 4, can be combined with one another.

The invention claimed is:

1. A vibration generator for a soil compacting device, comprising:

a first imbalance mass assembly including
- a first imbalance shaft that is driven rotationally in a first direction,
- a first imbalance mass fixedly connected to the first imbalance shaft,
- a second imbalance mass held on the first imbalance shaft so as to be capable of rotation relative to the first imbalance shaft in such a way that the second imbalance mass can be rotated between at least between two extreme position in which its imbalance effect increases or reduces that of the first imbalance mass;

a second imbalance mass assembly including
- a second imbalance shaft that is coupled in positively locking fashion with the first imbalance shaft so as to rotate in a second, opposite direction,
- an additional first imbalance mass fixedly connected to the second imbalance shaft,
- an additional second imbalance mass held on the second imbalance shaft so as to be capable of rotation relative to the second imbalance shaft in such a way that the additional second imbalance mass can be rotated between at least two extreme positions in which its imbalance effect increases or reduces that of the additional first imbalance mass; and an imbalance adjustment device that couples the second imbalance masses of the first and second imbalance mass assemblies in a positively locking fashion so that the second imbalance masses rotate in opposite directions in a coordinated maimer, wherein the positions of the second imbalance masses can be adjusted, using the imbalance adjustment device, such that, when the imbalance effects of the first and the second imbalance masses on the first imbalance shaft compensate to form a minimal imbalance value of the first imbalance mass assembly, the imbalance effects of the additional first and the second imbalance masses on the second imbalance shaft combine to form a maximum imbalance value of the second imbalance mass assembly, and vice versa.

2. A vibration generator as recited in claim 1, wherein, using the imbalance adjustment device, arbitrary intermediate positions for the second imbalance masses can be set between the two extreme positions.

3. A vibration generator as recited in claim 1, wherein the imbalance adjustment device includes a piston-cylinder unit that can be actuated hydraulically or pneumatically.

4. A vibration generator as recited in claim 1, wherein, when the imbalance adjustment device is set to a position obtaining a minimal imbalance value to one of the imbalance mass assembly, the imbalance effect emitted by the one imbalance mass assembly is at least substantially eliminated.

5. A vibration generator as recited in claim 1, wherein the first imbalance mass assembly includes a second additional first imbalance mass fixed on the first imbalance shaft and situated axially next to the first imbalance mass, and a second additional rotatable second imbalance mass mounted on the second imbalance shaft;

the second imbalance mass assembly includes a third additional first imbalance mass fixed on the second imbalance shaft and situated axially next to the additional first imbalance mass, and a third additional rotatable second imbalance mass mounted on the second imbalance shaft; and further comprising a second imbalance adjustment device that positively locks the second and additional second imbalance masses to one another to rotate in opposite directions.

6. A vibration generator as recited in claim 1, wherein the positively locking rotational coupling between the first and the second imbalance shafts and the imbalance adjustment device includes two intermediate shafts that are rotatably coupled to one another in a positively locking fashion so as to be capable of rotation in order to increase the distance between the first and the second imbalance shafts.

* * * * *

UNITED STATES PATENT AND TRADEMARK OFFICE

CERTIFICATE OF CORRECTION

PATENT NO. : 7,117,758 B2
APPLICATION NO. : 10/473473
DATED : October 10, 2006
INVENTOR(S) : Franz Riedl It is certified that error appears in the above-identified patent and that said Letters Patent is hereby corrected as shown below:

| | |
|---|---|
| Col. 6, Line 30 | Delete the word “between”. |
| Col. 6, Line 30 | Replace the word “position” with -- positions --. |
| Col. 6, Line 34 | Insert -- a -- before the word “positively”. |
| Col. 6, Line 50 | Replace the word “maimer” with the word -- manner --. |

Signed and Sealed this

Twenty-third Day of January, 2007

JON W. DUDAS
*Director of the United States Patent and Trademark Office*